United States Patent
Jackson

(10) Patent No.: US 6,898,817 B1
(45) Date of Patent: May 31, 2005

(54) SPORTS SHOE BRUSH/SCRAPER MOUNT FOR ATTACHMENT TO THE BUMPER OF A CART

(76) Inventor: Thomas D. Jackson, 1502 Lorene La., Marlin, TX (US) 76661

( * ) Notice: Subject to any disclaimer, the term of this patent is extended or adjusted under 35 U.S.C. 154(b) by 0 days.

(21) Appl. No.: 10/726,035

(22) Filed: Dec. 1, 2003

(51) Int. Cl.$^7$ .............................................. A47L 23/00
(52) U.S. Cl. ............................. 15/112; 15/161; 15/237; 280/164.2
(58) Field of Search .................... 15/112, 161, 215–217, 15/237, 238; 280/164.2

(56) References Cited

U.S. PATENT DOCUMENTS

| | | | | |
|---|---|---|---|---|
| 598,451 A | * | 2/1898 | Trumpler ..................... | 15/112 |
| 796,895 A | * | 8/1905 | Childers ..................... | 15/237 |
| 1,156,751 A | * | 10/1915 | Callender .................... | 15/112 |
| 1,170,411 A | * | 2/1916 | Callender .................... | 15/112 |
| 1,179,541 A | * | 4/1916 | Martin ........................ | 15/112 |
| 1,389,201 A | * | 8/1921 | Linville et al. ............... | 15/112 |
| 1,534,156 A | * | 4/1925 | Callender .................... | 15/112 |
| 1,760,815 A | * | 5/1930 | Cazel ......................... | 15/112 |
| 3,142,853 A | | 8/1964 | Hensley ....................... | 15/160 |
| 3,740,072 A | * | 6/1973 | Veith ......................... | 280/164.2 |
| D318,826 S | | 8/1991 | Parchment .................... | D12/16 |
| 5,075,917 A | * | 12/1991 | Wheat et al. .................. | 15/161 |
| D356,892 S | | 4/1995 | Ricci ......................... | D4/116 |
| 5,437,075 A | | 8/1995 | Peake ......................... | 15/161 |
| 6,032,316 A | | 3/2000 | Peake ......................... | 15/161 |
| 6,363,567 B1 | | 4/2002 | Woodward ..................... | 15/161 |
| 6,530,105 B1 | * | 3/2003 | MacDonald .................... | 15/161 |

* cited by examiner

Primary Examiner—Mark Spisich
(74) Attorney, Agent, or Firm—Sherman D. Pernia

(57) ABSTRACT

A brush/scrapper device cleans dirt and debris from the soles of outdoor sports shoes, such as the cleats of golf or other such shoes. The device is a single piece frame having a body portion to which a brush is mountable and an appendage portion for engaging a bumper. The frame being a single piece bent to form the body and appendage portions and is removably mountable on the bumper of a vehicle like a golf cart without modification of the vehicle.

8 Claims, 4 Drawing Sheets

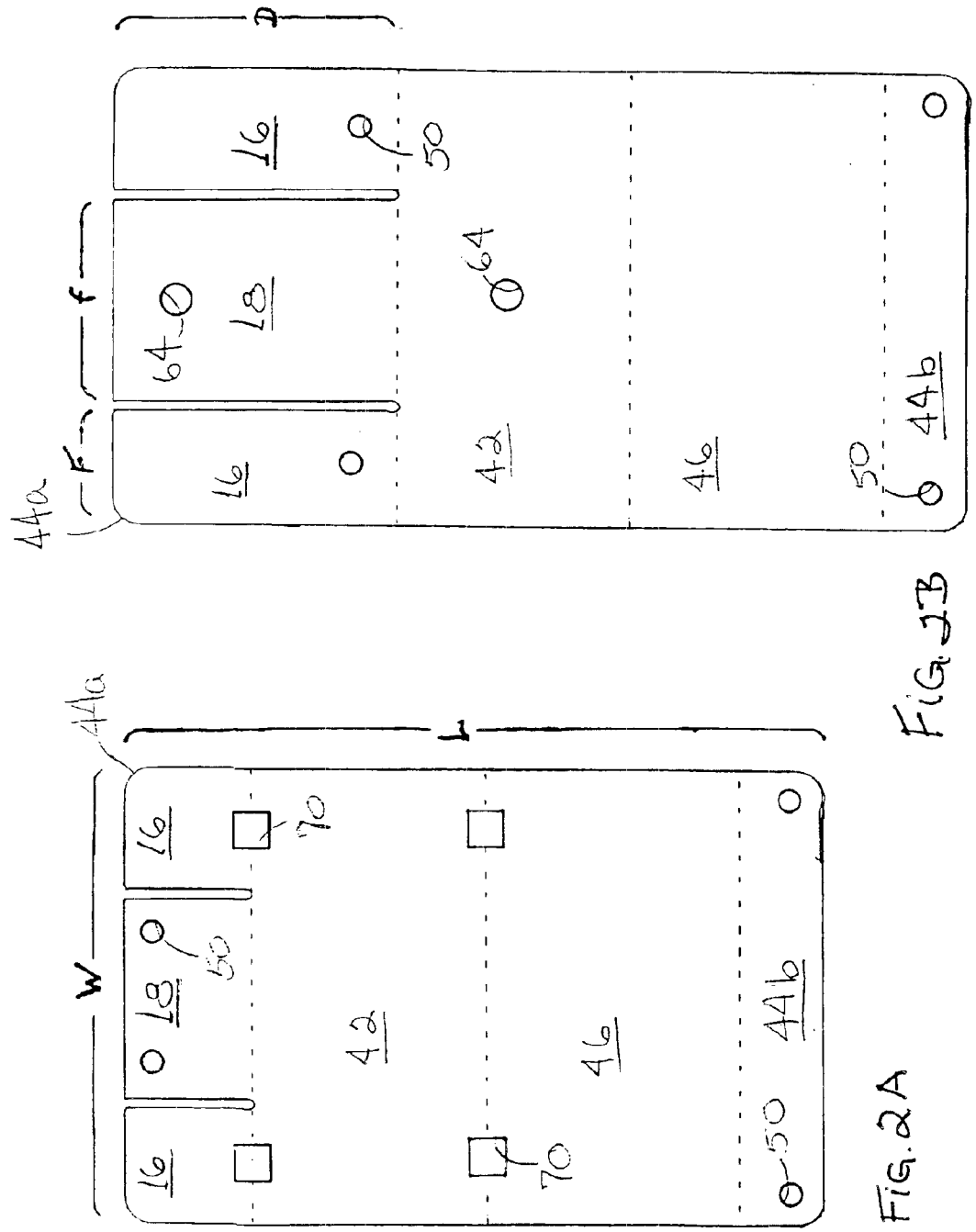

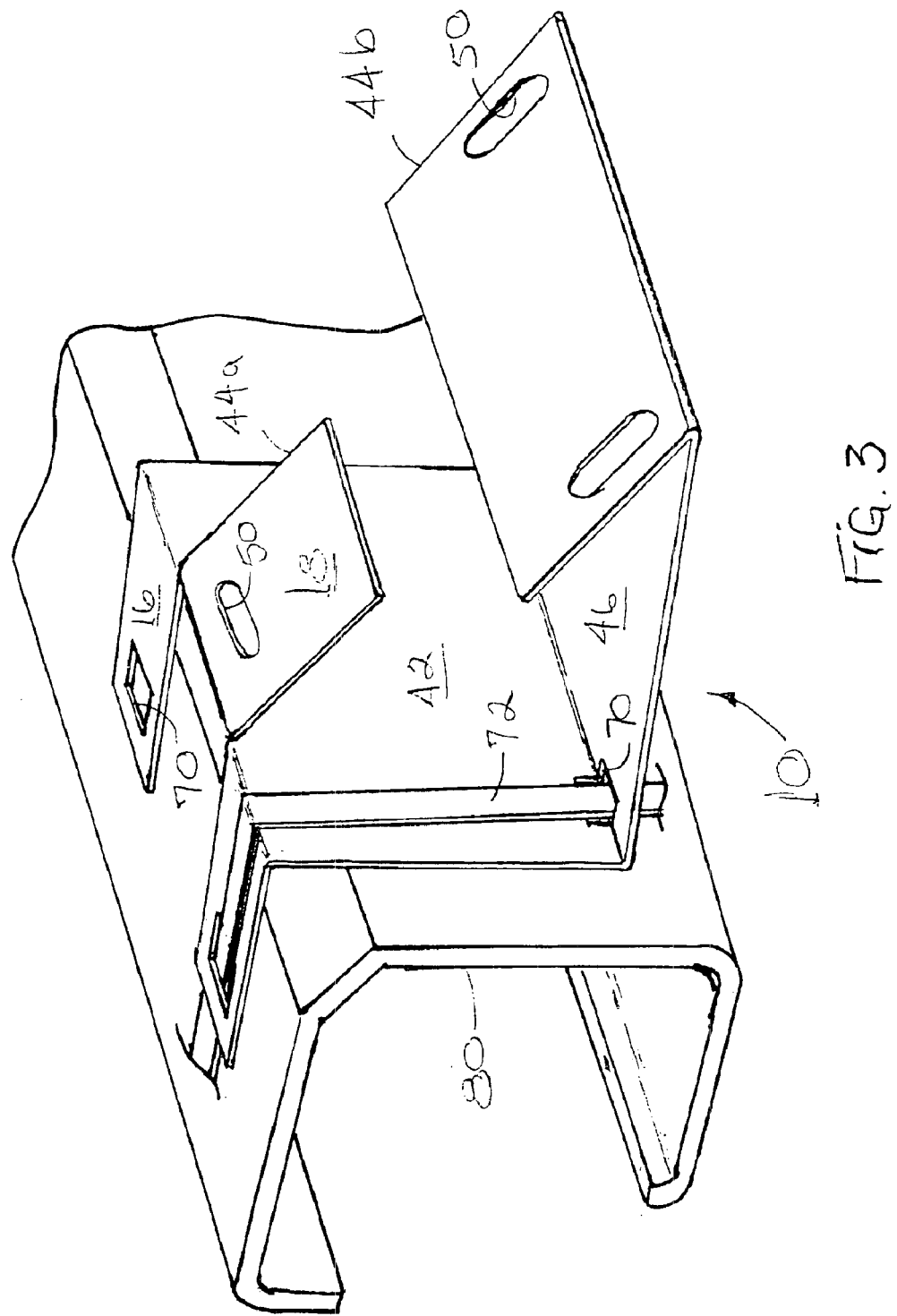

US 6,898,817 B1

SPORTS SHOE BRUSH/SCRAPER MOUNT FOR ATTACHMENT TO THE BUMPER OF A CART

FIELD OF THE INVENTION

The present invention is in the field of apparatuses designed or adapted for cleaning by scraping or wiping. Specifically, the present invention is a device having a working face especially adapted to act as a wiper/scrapper for cleaning the soles of sports shoes having cleats or spikes on them by the wearer manually drawing the sole of the shoe over the working face, and the device being removeably mountable on the bumper of a cart.

BACKGROUND OF THE INVENTION

Various types of sports shoes are intended for wear and use on natural ground, turf and similar surfaces. Such sport shoes often have cleats, spikes or other features on the bottom surface of the soles to increase traction. These traction features can be subject to the accumulation of mud, soil, turf and the like in the course of being worm. Golfing shoes are an example of such sport shoes, and have cleats on the bottom sole which are subject to the buildup of dirt and other muck between the cleats. To remove such buildup, a golfer must carry a cleat cleaning device with them, such as a brush or a scrapper. Therefore, it is desirable in the field to have available an alternative a cleat cleaning device to spare the golfer from having to carry one around that is soiled from use. The field has been motivated to provide alternatives to having to personally carry a cleat cleaning tool.

An example of an alternative cleat cleaning tool is disclosed in Woodward, U.S. Pat. No. 6,363,567. Woodward discloses a vehicle mounted golf shoe brush that is extendable from and retractable under the rear bumper of a vehicle. The mount element of the Woodward device is relatively complex having multiple component parts, some of which are required to move in relationship to each other. Other examples of shoe cleaning brush devices attachable to a golf cart are disclosed in U.S. Pat. Nos. 6,032,316 and 5,437,075 to Peake. The Peake devices both include hinge mechanisms for changing the positioning of the brush elements of the device, and are made of multiple separate components. A further example is the golf shoe cleaning device of U.S. Pat. No. D318,826 to Parchment, which discloses a brush and hinge assembly allowing the brush feature to be enclosed in a housing when not in use. There are other types of golf shoe cleaning devices known in the literature. See U.S. Pat. Nos. 3,142,853 and D356,892 to Hensley and to Ricci, respectively. These devices are mountable to round stock such as may be found on a pole.

Although each of the above shoe cleaning devices mountable on a vehicle may be useful for their intended purposes, it is clear that the field finds useful such devices mountable on a vehicle such as a golf cart. Also, because these devices may be exposed to weather as well as the accumulation of soil and other debris or muck, any moving parts may become fouled and/or corroded. It would be beneficial in the field to have an alternative shoe cleaning device that is attachable to a golf cart, yet does not have moving parts that may be subject to binding up due to fouling or corrosion. In addition to simplicity, it would be beneficial to have such a shoe cleaning device providing for its easy mounting and removal from the vehicle, and for which the work face (brush, scraper or the like) could be separately and easily replaced.

SUMMARY OF THE INVENTION

The present invention is a device useful for cleaning dirt and other debris from the bottom sole of a outdoor use sports shoe. Sport shoes for "outdoor use" often have cleats, spikes or other features on the bottom surface of the soles to increase traction. These traction features can be subject to the accumulation of mud, soil, turf and the like in the course of being worn. The present invention is useful for cleaning such material from the features on the bottom sole of such sport shoes. A specific example of such features and shoes are the cleats on the bottom sole of golf shoes. Examples of other types of such sport shoes include baseball spikes, football and soccer cleats.

In use, the present invention is mounted on the bumper of a vehicle such as a golf cart. The bottom sole of a golf shoe is cleaned by the wearer drawing the sole of the shoe to be cleaned across the work face of a brush or scraper mounted on the present device. The present shoe cleaning device mount can be practiced with a standard golf cart as are typically in the field.

The present shoe cleaning device mount comprises a single piece frame member having two major potions: a body portion; and an appendage portion. A cleaning unit is mounted to the body portion of the single piece (unitary) frame member. The body portion has a generally triangular cross-section with a first side of the triangle forming the back of the body portion, a second side of the triangle forming the bottom of the body portion and the third side forming the front of the body portion. Further, the front side of the body portion has mounting means for attaching a cleaning unit to the body portion of the frame. The appendage portion of the frame/mount is integral with the body portion, and extends from the top of the frame (where the back side and the front side of the body join), and is formed to receive the bumper between itself and the frame back.

It is intended that the present sports shoe brush/scraper mount be simply and easily attachable and removably to the bumper of a vehicle, such as a golf cart. That is, by hand or and without modification of the vehicle. A clamping fastener, such as a set screw, may be provided to pass through the appendage portion and/or the back side of the body portion to secure the frame member to the bumper to accomplish the intended ease of attachment and removablity. Additionally, it is an intended option that the cleaning unit be replaced if desired.

BRIEF DESCRIPTION OF THE DRAWINGS

FIGS. 2A and 2B are top plan views of alternative single piece frame members of the present invention prior to being configured into a cleaning unit mount.

FIG. 3 is a perspective view of an alternative frame member configuration for receiving a brush/scrapper and for attaching to the bumper of a cart, such as a motorized golf cart.

DETAILED DESCRIPTION OF THE INVENTION

Figure 1A:
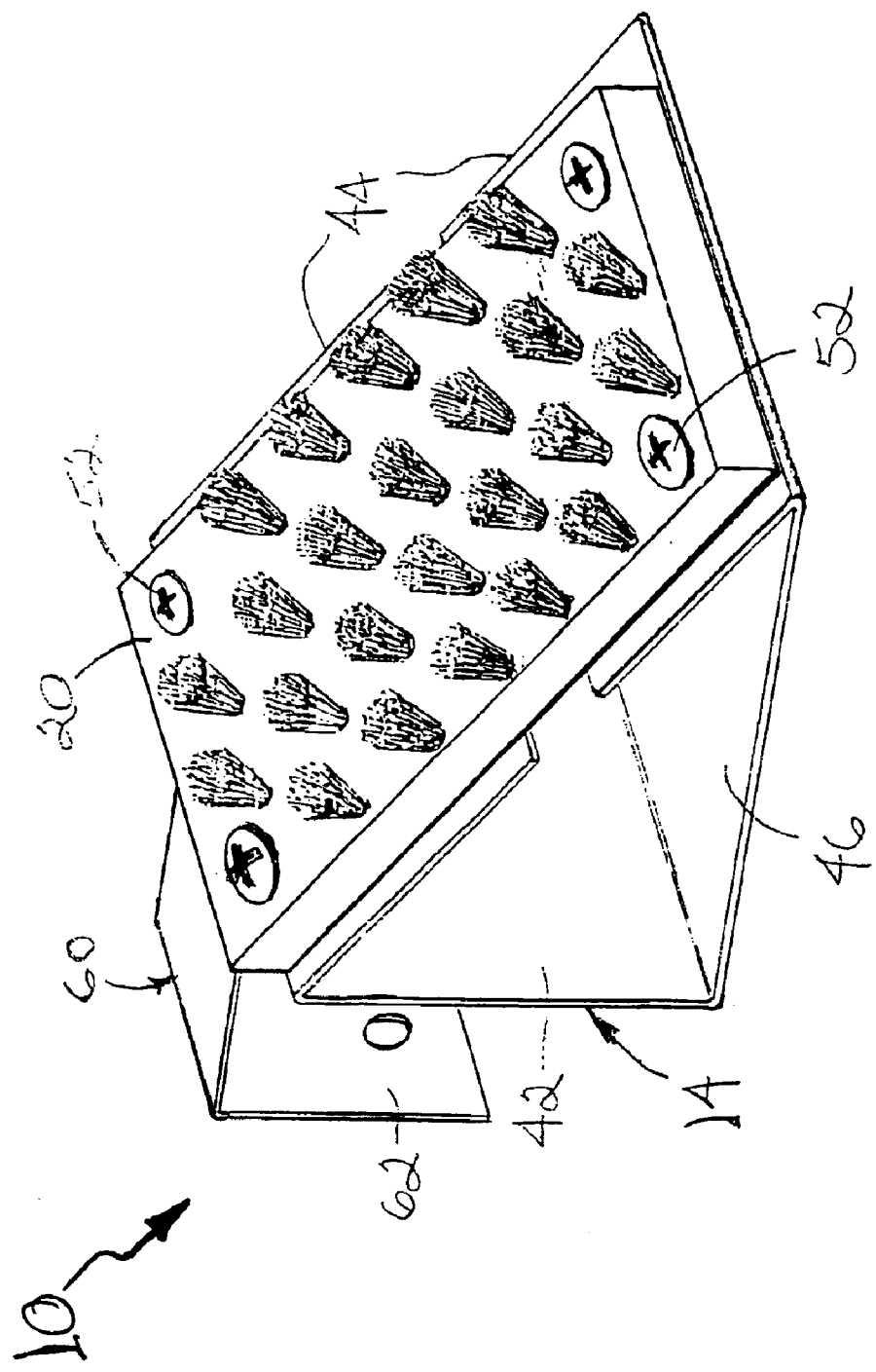
FIG. 1A is a perspective view of the present shoe cleaning device including the unitary frame member with a brush-type cleaning unit mounted on it.

Referring now to the drawings, the details of preferred embodiments of the present invention are graphically and schematically illustrated. Like elements in the drawings are represented by like numbers, and any similar elements are represented by like numbers with a different lower case letter suffix.

Figure 1B:
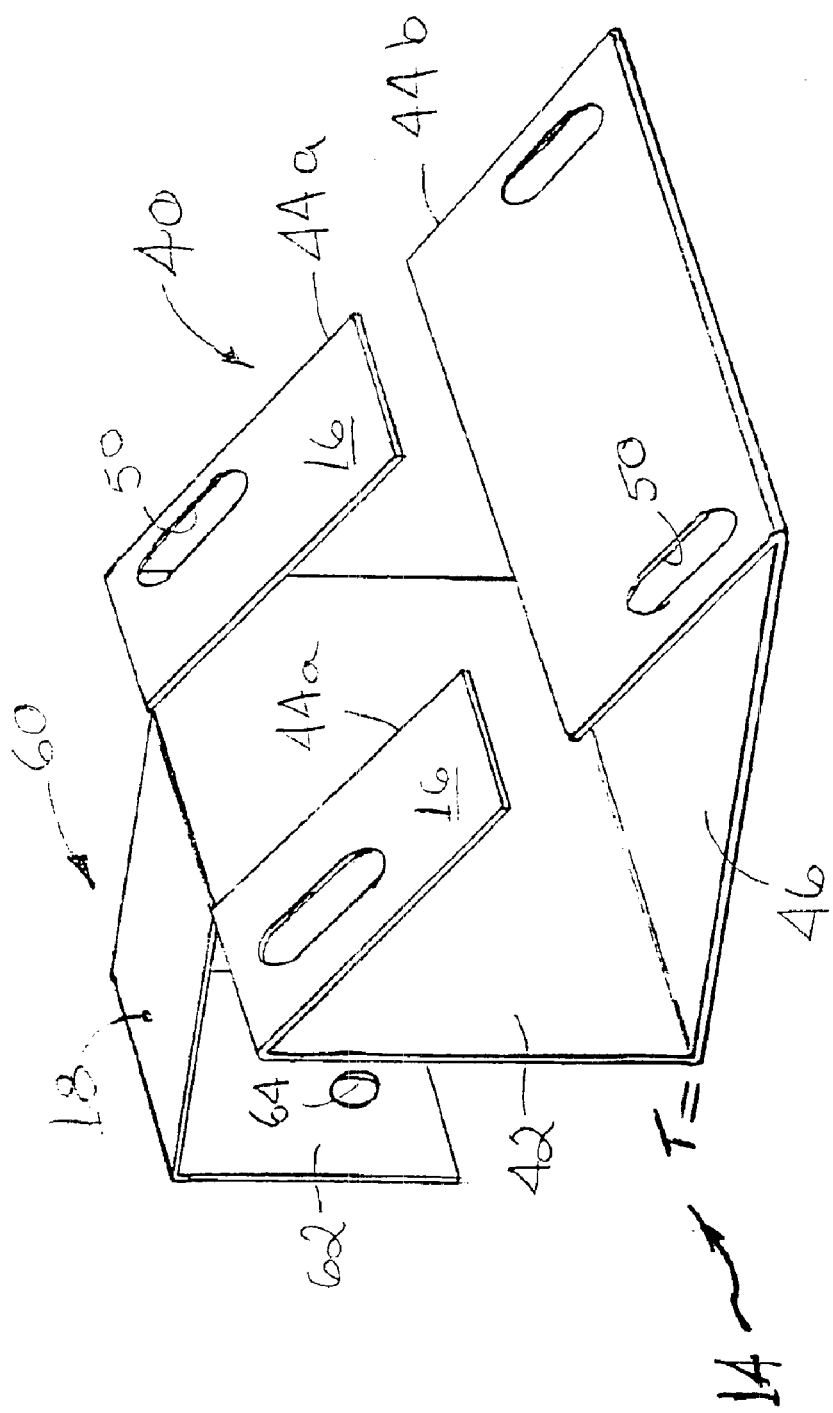
FIG. 1B is a perspective view of the present shoe cleaning device illustrating an exemplary configuration of the unitary frame member as may be practiced in FIG. 1.

As exemplified in FIGS. 1A and 1B, the present invention is a sports shoe cleaning device 10 for the removal of dirt and other debris or muck from the bottom sole of an outdoor use sports shoe. The present sports shoe cleaning device 10 comprises a unitary frame member 14 having a body portion 40 and an appendage portion 60. A cleaning unit 20 is mounted to the body portion 40 of the frame member 14. Typically, the present shoe cleaning device is removably mounted on the bumper of a vehicle like a golf cart. The device is useful for removing dirt and other buildup from the traction features (not shown) on the bottom sole of an outdoor use sports shoe. A example of such traction features are the cleats on the bottom sole of golf shoes.

As illustrated in FIGS. 2A and 2B, the unitary frame member 14 is constructed as a single piece which integrally incorporates both the body portion 40 and the appendage portion 60 of the device 10. The unitary frame member 14 can be constructed of any of a variety of materials selectable to one of ordinary skill in the art. In a preferred embodiment, the frame member 14 was constructed of a single piece of sheet metal. However, the ordinary skilled artisan knows of other materials suitable for practicing the frame member 14, such as metal flat stock, plastic flat stock or a combination thereof. It is intended that the material utilized for the single integrated piece be bendable to form the body 40 and appendage 60 portions of the unitary frame member 14.

The starting dimensions of the single piece frame member 14 are selectable by the ordinary skilled artisan. In a preferred embodiment the frame member 14 started as a single piece of aluminum sheet metal and had a length L, a width W and a thickness T of: 14 inches, 5 inches and 3/32 inch, respectively. The side tabs 16 each had a width F of 1.5 inches and were split to a depth D of 4 inches leaving a center tab 18 which had a width f of 2 inches. As illustrated in FIGS. 2A and 2B, the body 40 and appendage 60 portions of the present sports and outdoor shoe scraper device 10 are formed by appropriately bending the single piece frame member 14 into the proper configuration. In the embodiment shown, the body back 42 was about 3.5 inches, the body bottom 46 was about 4.5 inches. When the single piece frame member 14 starts as a piece of flat plastic, it can be advantageous to form a groove (not shown) in the plastic along the line of the intended bend to facilitate bending the plastic piece to the desired configuration. Also, if desirable, either the side tabs 16 or the center tab 18 may be further shortened as the ordinary skilled artisan finds appropriate in practicing the present invention. In the embodiment shown, the side tabs 16 were shortened by 2 inches relative to the center tab 18.

The body portion 40 of the present outdoor/sport shoe cleaning device 10 has a substantially triangular cross-section with a first side of the triangle forming a back side 42 of the body portion 40, a second side of the triangle forming a front side 44 of the body portion 40 and a third side of the triangle forming a bottom side 46 of the body portion 40. Note the feature of the present invention wherein the front side 44 of the body portion 40 is discontinuous and comprises one or more front-upper tabs 44a and one or more front lower tabs 44b. The front-upper tabs 44a and front lower tabs 44b have mount means 50 disposed on them for mounting a cleaning unit 20 to the body portion 40 of the frame member 14. In the embodiment illustrated, the mount means 50 were through holes for passing a a fastener 52, and the cleaning unit 20 was mounted to the front side 44 of the body portion 40 of the frame member 14 using a threaded fastener 52—a combination nut and screw assembly. However, other means are known to and practicable in the present invention by the ordinary skilled artisan, such as self-tapping fasteners, pop-rivets, clamping means, clip means and adhesive means. In the embodiment shown in FIG. 1A, the cleaning unit 20 of the sport shoe cleaning device 10 was a stiff bristled brush. Such brushes appropriate for practice in the present device 10 are known in the art and are commercially available. Alternatively, the cleaning unit 20 can be a scrapper unit such as a boot scrapper, or a combination brush/scrapper unit.

In the embodiment illustrated in FIGS. 1A & 1B and FIG. 3, the body portion 40 had a substantially right-triangular cross-section with the height of the right triangle forming the body back 42, the hypotenuse forming the body front 44 and the base of the triangle forming the body bottom 46 of the body portion of the frame member 14. However, it is not a requirement of the present device 10 that the body portion 40 of the frame member 14 have a right triangular cross section. In fact, it is intended in the present invention that a frame member 14 made of a relatively bendable material, such as aluminum sheet metal or certain kinds plastic stock, will have some flexibility to allow ready adjustment to permit at least slightly different size cleaning units 20 to be mountable on the frame member 14. It is the feature of the front side 44 of the body portion being discontinuous and in two parts 44a & 44b that enables this flexibility.

In the preferred embodiment exemplified in FIGS. 1A and 1B, side tabs 16 were folded forward to form the front tabs 44a of the front side 44 of the body portion 40, and the center tab 18 was used to form the appendage portion 60. Alternatively, as illustrated in FIG. 3, the center tab 18 can be folded forward to form the front tab 44a of the front side 44 of the body portion 40, and the side tabs 16 are then used to form the appendage portion 60.

The appendage portion 60 of sport shoe cleaning device 10 is used to attach or interface the device 10 the bumper 80 (see FIG. 3) of a vehicle. In the preferred embodiments illustrated, the vehicle was a golf cart. In the embodiment exemplified in FIGS. 1A and 1B, the appendage portion 60 of the unitary frame member 14 extends away from the back side 42 of the body portion 40 proximate the front side 44 of the body portion 40. In this embodiment, the appendage portion 60 was adapted to hold the bumper 80 against the back side 42 of the body portion 40. This was accomplished by bending the center tab 18 of the frame member 14 to make a downward extending leg 62. The downward extending leg 62 of the appendage portion 60 had a fastener aperture 64. A threaded fastener (not shown) was threaded through the fastener aperture 64 and used as a set screw to secure the frame member 14 to the bumper. Alternatively, the fastener aperture 64 can be disposed in the back side 42 of the body portion 40 of the unitary frame 14 for receiving a set screw. Fastener apertures 64 can be disposed on both the downwardly extending leg 62 and the back side 42 of the body portion 40 for passing threaded fasteners secure the device 10 to a bumper.

Other attachment means to bumpers are known to and practicable by the ordinary skilled artisan in accomplishing the present shoe cleaner device 10. For example, the unitary frame member of FIG. 2A is intended to be tied to a bumper 80 as illustrated in FIG. 3. As exemplified in the figure, the sport shoe cleaning device 10 is attached to the bumper 80 utilizing attachment means comprising strap tie apertures 70 for passing strap ties 72 (partially shown) closely around both the frame member 14 and the bumper 80 together to attach the frame member 14 to the bumper 80. Strap ties 72 useful for this purpose are known in the art and are commercially available. Alternatively, a tie means 72 can be disposed to pass from a tie aperture 70 on the appendage portion 60 (see FIG. 3), around the bumper 80 and to a tie aperture 70 on the body portion 40 of the frame member 14 to removably attach the device 10 to the bumper 80.

While the above description contains many specifics, these should not be construed as limitations on the scope of the invention, but rather as exemplifications of one or another preferred embodiment thereof. Many other variations are possible, which would be obvious to one skilled in the art. Accordingly, the scope of the invention should be determined by the scope of the appended claims and their equivalents, and not just by the embodiments.

What is claimed is:

1. A sport shoe cleaning device for cleaning debris from a sole of a sports shoe, the device comprising:

a unitary frame member formed from a single sheet of material, the single sheet of material being bent to form an appendage portion and a body portion of the frame member, the appendage portion being adapted to engage a bumper on a vehicle, the body portion being formed in a substantially triangular configuration, the triangular body portion including a back side, a bottom side and a front side, the bottom side extending between the back and front sides, the front side formed by tab portions extending from the back and bottom sides, the appendage portion extending from the back side proximate the front side; and a cleaning unit mounted to the front side of the body portion.

2. The sport shoe cleaning device of claim 1 further comprising an attachment means for attaching the unitary frame member to the vehicle bumper.

3. The sport shoe cleaning device of claim 1, wherein the unitary frame member is a single integrated piece selected from the group consisting of: sheet metal, metal flat stock, plastic flat stock or a combination thereof, the single integrated piece being bendable to form the body and appendage portions of the unitary frame member.

4. The sport shoe cleaning device of claim 1, wherein the appendage portion of the unitary frame member extends away from the back side of the body portion proximate the front side of the body portion, the appendage portion being adapted to hold the bumper against the frame back side.

5. The sport shoe cleaning device of claim 1, wherein the appendage portion of the unitary frame has a fastener aperture for passing a threaded fastener through the appendage portion to removably attach the frame member to the bumper.

6. The sport shoe cleaning device of claim 1, wherein the body portion of the unitary frame has a fastener aperture for passing a threaded fastener through a back of the body portion to removably attach the device to the bumper.

7. The sport shoe cleaning device of claim 1, wherein the cleaning unit is mounted on the body portion of the frame member by a mounting means selected from the group consisting of threaded fasteners clamping means, clip means and adhesive means.

8. The sport shoe cleaning device of claim 1, wherein the cleaning unit is a unit selected from the group consisting of: a brush unit, a scrapper unit, and a combination brush/scrapper unit.

* * * * *